(12) United States Patent
Geiger et al.

(10) Patent No.: US 8,506,791 B2
(45) Date of Patent: Aug. 13, 2013

(54) LINEAR GUIDE

(75) Inventors: Harald Geiger, Gaildorf (DE); Jochen Laun, Gaildorf (DE); Thomas Widmann, Untergröningen (DE)

(73) Assignee: MTU Aero Engines GmbH, Munich (DE)

( * ) Notice: Subject to any disclaimer, the term of this patent is extended or adjusted under 35 U.S.C. 154(b) by 884 days.

(21) Appl. No.: 12/064,151

(22) PCT Filed: Aug. 16, 2006

(86) PCT No.: PCT/DE2006/001431
§ 371 (c)(1),
(2), (4) Date: Sep. 20, 2008

(87) PCT Pub. No.: WO2007/022752
PCT Pub. Date: Mar. 1, 2007

(65) Prior Publication Data
US 2009/0016810 A1    Jan. 15, 2009

(30) Foreign Application Priority Data
Aug. 19, 2005 (DE) .......................... 10 2005 039 279

(51) Int. Cl.
| | |
|---|---|
| B23H 3/00 | (2006.01) |
| B23H 5/00 | (2006.01) |
| B23H 7/00 | (2006.01) |
| B23H 9/00 | (2006.01) |
| B23H 11/00 | (2006.01) |
| C25F 3/00 | (2006.01) |
| C25F 7/00 | (2006.01) |
| H05K 3/07 | (2006.01) |
| F16D 1/12 | (2006.01) |
| F16D 3/00 | (2006.01) |
| F16C 11/00 | (2006.01) |

(52) U.S. Cl.
USPC .......................................... 205/640; 403/119

(58) Field of Classification Search
USPC ..... 205/640; 204/224 M, 297.01; 219/69.17; 403/119, 145, 220
See application file for complete search history.

(56) References Cited

U.S. PATENT DOCUMENTS
3,390,068 A * 6/1968 Ellis et al. ..................... 204/217
3,410,781 A * 11/1968 Dettmer et al. .......... 204/224 M
(Continued)

FOREIGN PATENT DOCUMENTS
| DE | 31 43 092 A1 | 5/1983 |
| DE | 102 52 118 A1 | 5/2004 |

(Continued)

*Primary Examiner* — Sam P Siefke
*Assistant Examiner* — Bryan Kilpatrick
(74) *Attorney, Agent, or Firm* — Greer, Burns & Crain, Ltd.

(57) ABSTRACT

A linear guide, in particular for a device for electrochemical metal machining, that guides a linear movement of a quill that is moved periodically in a machine frame in order to periodically modify a working gap between a cathode situated on the quill and a workpiece in the direction of the longitudinal axis of the quill, the quill being connected to the machine frame by a plurality of connecting rods, the connecting rods being situated, in the no-load, non-deflected state, essentially parallel to the longitudinal axis of the quill, and the connecting rods having at the point of connection to the quill, as well as at the point of connection to the machine frame, a notch hinge in order to enable, via the hinge, the periodic linear movement of the quill, and the flexibilities of these notch hinges being based on elasticities in their structures formed by targeted thinning of the material.

16 Claims, 2 Drawing Sheets

(56) References Cited

U.S. PATENT DOCUMENTS

| | | | |
|---|---|---|---|
| 4,029,928 A * | 6/1977 | Ullmann et al. | 219/69.15 |
| 8,034,228 B2 * | 10/2011 | Bayer et al. | 205/651 |
| 2006/0138897 A1 | 6/2006 | Hess | |

FOREIGN PATENT DOCUMENTS

| | | |
|---|---|---|
| EP | 1 097 774 A | 5/2001 |
| JP | 2002 154013 | 5/2002 |
| WO | WO 2005/043209 A2 | 5/2005 |

* cited by examiner

LINEAR GUIDE

The present invention relates to a linear guide, in particular for a device for electrochemical machining of metal, that guides a linear movement of a quill that is moved periodically in a machine frame, in order to periodically modify a working gap between a cathode situated on the quill and a workpiece, in the direction of the longitudinal axis of the quill.

Linear guides for quills of devices for electrochemical metal machining are well-known. In precise electrochemical metal machining, working gap sizes of less than 100 μm arise. This very small gap between the workpiece and the cathode permits almost no electrolyte exchange during a continuous advance. This disadvantage can be countered by an oscillation of the cathode having a small amplitude and a corresponding frequency, the oscillation being superposed on the actual advance movement of the cathode into the workpiece that is to be machined. In this way, a sufficient exchange of the electrolyte in the working gap can be achieved in order to optimize the machining.

Due to very high precision tolerances in the machining, the linear guide of the oscillatory movement of the quill that carries or guides the cathode requires guide elements that are as free of play as possible, and are thus pre-tensioned, having a high degree of rigidity. For the continuous advance, for example ball guides may be used, which however are not suitable for the oscillating cathode bearer, which oscillates with a corresponding amplitude and frequency. Due to the small movement amplitudes, if roller guides are used there is not a sufficient roll-off movement, which results in lack of lubrication of the roller elements and thus to dry running, or to increased wear, or to seizing of the guide. This problem also applies to sliding guide designs, because here as well a sufficient hydrodynamic lubrication cannot be achieved. Other solutions use hydrostatic bearings, air bearings, or magnetic bearings. However, most of the possible solutions must be ruled out as quill bearings, for technical or cost reasons.

EP 1 097 774 A1 discloses a device for the electrochemical machining of metals having two components that are guided relative to one another and are movable along a defined path in a machine housing, in particular along a rectilinear axis, between whose opposed surfaces (or between the opposed surfaces of additional parts situated thereon) a narrow working gap can be set. Here, means are provided for imposing a periodic, distance-limited oscillatory movement on at least one part, having such a limiting surface, of one of the two components, independent of the advance drive, in order in this way to periodically modify the set working gap. The part of the one component, said part being driven with distance-limited periodic oscillatory movement and having a limiting surface of the gap and being realized as a cathode, is here guided in such a way that this movement takes place only in the direction of the defined path, and the periodic drive acts on the named part. Here, the distance-limited oscillatory periodic movement of the cathode is brought about through an elastic deformation of at least one membrane situated in a plane perpendicular to the path. Here, the quill that carries the cathode is guided via two membranes. Disadvantageously, the ratio of the radial rigidity to the axial rigidity (and thus the deflection force) cannot be arbitrarily varied. The deflection of this guide is based on structural expansions in the membranes, and can be made larger only to a limited extent. The constructive design is relatively large and poorly scalable, and its required part structure is extensive.

The object of the present invention is therefore to create a linear guide for the periodic movement of a quill for a device for electrochemical metal machining whose radial or axial rigidity can be varied arbitrarily, and that can be made larger to a limited extent, and that has a compact, scalable construction having a simple part structure.

According to the present invention, this object is achieved by a device for electrochemical metal machining having the features of patent claim 1. Advantageous developments of the present invention are indicated in the dependent claims.

The present invention incorporates the technical teaching that the quill is connected to the machine frame by a plurality of connecting rods, the connecting rods being situated essentially perpendicular to the longitudinal axis of the quill in the no-load, non-deflected state, and the connecting rods having a notch hinge at the point of connection to the quill and at the point of connection to the machine frame, in order to enable, via this notch hinge, the periodic linear movement of the quill.

This solution has the advantage that a linear guide for the periodic movement of a quill in a device for electrochemical metal machining has a variable ratio between the axial and the radial rigidity. This ratio can in particular be set via an arbitrarily modifiable axial rigidity, by adjusting the rigidity of the elastically deformed parts or areas of the notch hinge. In addition, the number of connecting points or the number of connecting rods between the machine frame and the axially moved quill can be modified, the rigidity increasing given a larger number of connecting rods and decreasing given a smaller number of connecting rods. Thus, in particular the rigidity can be adapted to the oscillating spring-mass system in order, dependent on the mass of the cathode situated on the quill, to realize the oscillation at or near the natural frequency of the spring-mass system. A further essential advantage is the small constructive space of the linear guide, because in particular the arrangement of metal membranes is omitted.

The system according to the present invention is based on the principle of a kinematic linkage; here, due to the small deflections notch hinges having a flexible beam design can be used. The flexibility of these notch hinges is based on elasticity of their structure, which is formed by targeted thinning of the material and which causes a resetting force in the area of their elastic deformation, dependent on the deflection.

An advantageous arrangement of the connecting rods that form the linear guide provides that the quill has at least two bearing planes, each bearing plane being formed from at least one connecting rod, preferably from two connecting rods, and particularly preferably from a multiplicity of connecting rods. A uniformly distributed arrangement of connecting rods over the circumference of the quill enables a radially symmetrical rigidity of the quill relative to the machine frame. Thus, given an arrangement of three connecting rods at each bearing point the connecting rods can form an angle of 120° to one another; given four connecting rods the angle will be 90°, and given a higher number of connecting rods the connecting rods will form identical angles to one another. The radially symmetrical rigidity of the quill relative to the machine frame ensures a high degree of guiding precision that has a positive effect on the achievable machining tolerances.

Advantageously, the at least two bearing planes are situated at a large distance from one another in the direction of the longitudinal axis of the quill, in order to optimize the rigidity of the linear guide. Given a large distance of the bearing planes from one another, undesirable deflections of the quill in the radial direction can be minimized. This advantageous arrangement ensures a minimum longitudinal force in the connecting rods, so that these rods can be made smaller, enabling a space-saving arrangement.

An advantageous specific embodiment of the linear guide according to the present invention provides that in order to achieve an elastic movement the notch hinges have flexible beams that are formed by recesses made lateral to the flexible beams. The flexible beams thus represent the elastic area of the notch hinge, in which a deflection movement of the moved part of the notch hinge relative to the stationary part of the notch hinge can be realized through an elastic deformation of the material of the notch hinges. Here, the rigidity of the notch hinge can be varied via the width of the flexible beams, the rigidity decreasing with smaller width of the flexible beam. The notch hinges can be realized as plate or leaf springs, the flexible beams going over to the connecting rods in one piece. In this way, a simple part structure can advantageously be achieved without having to assemble the notch hinges to the connecting rods. The transition of the flexible beam to the connecting rod enables a one-part realization of the point of connection to the connecting rod, a connecting rod having at least two notch hinges, so that this connecting rod can be situated both at the side of the machine frame and also at the side of the quill. The geometry or design of the connecting rod can be such that the elastic deformation either continues into the connecting rod or is limited to the area of the flexible beam in the notch hinge.

A possible specific embodiment of the recesses in the notch hinges provides that these recesses have an elliptical, circular, rectangular, and/or triangular contour. Dependent on the required rigidity of the flexible beam, the geometry can be adapted to the recesses situated laterally to the flexible beam. An elliptical or circular recess creates a smooth transition of the flexible beam of the notch hinge to the solid part or to the moved part of the notch hinge, whereas triangular or rectangular recesses cause a cross-sectional jump. Dependent on the size of the recess, with an elongated geometry of the flexible beam a low rigidity can be achieved, whereas a short length of the flexible beam results in high rigidity.

Another advantageous specific embodiment of the present invention provides that the connecting rod is connected to a compensating bridge, at least one connecting rod being situated between the compensating bridge and the machine frame and at least one connecting rod being situated between the compensating bridge and the quill. The principle of the functioning of the arrangement having a compensating bridge is based on the cooperation of parallel connecting rods, each pair of connecting rods being deflected in the same direction. The advantage of this exemplary embodiment lies in the doubling of the distance that the quill can travel in the axial direction without requiring significant enlargement of the constructive space. In addition, it is possible to situate the point of connection of the connecting rod to the machine frame close to the longitudinal axis of the quill, because in the non-deflected state the connecting rods between the quill and the compensating bridge run parallel to the connecting rods between the compensating bridge and the machine frame. Through this arrangement, in comparison to the direct connection of the quill to the machine frame via connecting rods, the flexibility can be increased, so that given an identical construction of the connecting rods between the quill and the compensating bridge, or between the compensating bridge and the machine frame, the deflecting force can be halved for the same deflection, or, for a given deflecting force the distance that the quill travels in the axial direction can be doubled. Here, the compensating bridge can be situated so as to be multiply uniformly distributed around the quill, and can have a rod-shaped body, or, as a cylindrical hollow body, can accommodate the quill. The points of connection of the connecting rods in the various bearing planes can be situated on a common compensating bridge, so that the compensating bridge is also axially guided via the connecting rods by the connection to the machine frame.

Advantageously, the notch hinges and/or connecting rods are made from a flat material; their manufacture can be a laser beam separating process, an erosion process, a PECM process or a water jet cutting process. Here, the plane of the flat material is situated between the quill and the machine frame in such a way that it is fixed both by the longitudinal axis of the connecting rod and also by the direction of movement of the quill. The realization of the notch hinges from a flat material makes possible the application of a manufacturing process from the field of plate machining. A laser beam separation process, an erosion process, a PECM process or a water jet cutting process all offer very precise manufacturing possibilities, the PECM process being an electrochemical machining process using pulsed electrical current. An advantageous specific embodiment of the notch hinges can additionally provide exchangeability of the flexible beam, so that the rigidity of the notch hinges, and thus of the linear guide of the quill, relative to the machine frame can be adapted to the requirements relating to the mass of the cathode or to the desired oscillation amplitude of the oscillatory movement.

Dependent on the required oscillation mode, it is provided that the periodic linear movement is an oscillatory movement having a stroke of <5 mm. Another realization of the oscillatory movement provides a stroke of <1 mm, or a stroke of <0.1 mm. The size of the stroke of the linear movement is adapted to the process of electrochemical metal machining; given a larger stroke, a greater electrolyte exchange can be achieved in the machining gap, whereas given a smaller stroke a higher machining precision can be achieved. The frequency of the oscillatory movement has a value of <500 Hz; in another exemplary embodiment, the oscillatory movement has a frequency of <50 Hz, and in still another exemplary embodiment the oscillatory movement has a frequency of <10 Hz. A higher frequency can be set for a smaller moved mass, and a smaller frequency can be set for larger masses. The rigidity of the flexible beam in the notch hinge can be adapted to the required frequency of the oscillatory movement, a higher rigidity causing a higher frequency and a lower rigidity causing a lower frequency.

For constructive reasons, it is particularly advantageous that the notch hinges and/or the connecting rods comprise a metallic material from the group including a spring steel, and preferably a stainless steel. A metallic material offers the advantage that the notch hinges or the connecting rods can be produced using one of the above-named production processes, and a spring steel fulfills the requirement of the elastic properties of the flexible beam. The selection of a special steel as a material for the notch hinges or for the connecting rods additionally enables a corrosion-free realization of the linear guide. Other materials such as special, highly elastic ceramics are additional possible materials for this purpose. The notch hinges can be realized as plate springs, the flexible beams going over into the connecting rods in one piece. This variant embodiment results in a simple design, in which the connecting rod, the notch hinge at the machine frame, and the notch hinge at the quill can be abstracted to a flexible beam, and the elastic deformation for achieving the oscillatory movement extends over the entire length of the connecting rod.

In the following, an advantageous specific embodiment of the present invention is explained in more detail in relation to the Figures.

The Figures are schematic representations, meant to serve only as examples.

Figure 1:
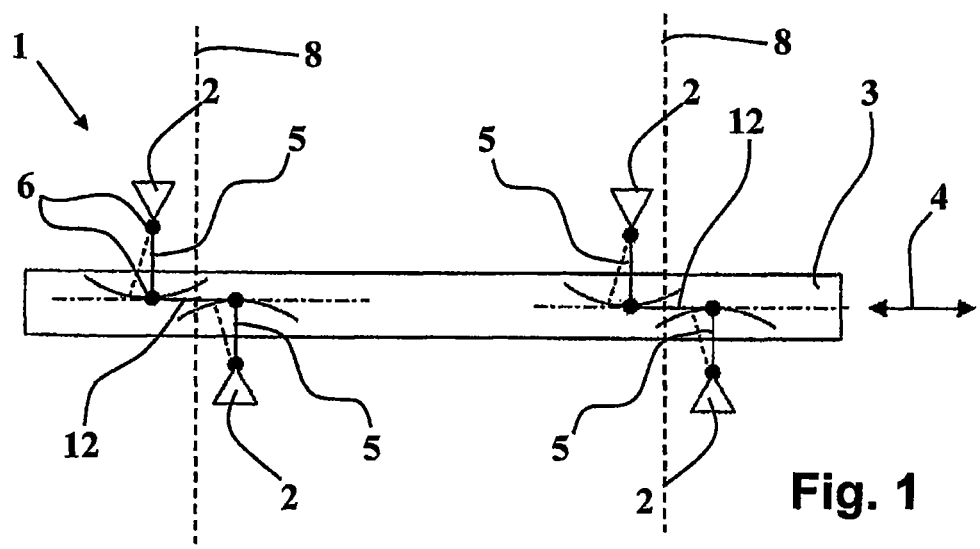
FIG. 1 shows a schematic representation of a linear guide of a quill that is axially connected in movable fashion to the machine frame via connecting rods.

The linear guide 1 shown in FIG. 1 guides a quill 3 that is capable of axial movement on a longitudinal axis 4 relative to a machine frame 2, machine frame 2 being indicated schematically by a total of four stationary bearings. Here the stationary bearings are to be understood as stationary supports, so that the axial movement of quill 3 takes place along longitudinal axis 4 relative to stationary machine frame 2, quill 3 being represented schematically in simplified fashion by a rectangular beam that runs horizontally in the image plane. In order to illustrate the action of the guide design realized by connecting rods 5 of linear guide 1, first a kinematic linkage is abstractly shown that comprises these two connecting rods 5 and a coupler 12. Connecting rods 5 are each connected at one side to stationary machine frame 2, the freely movable ends of connecting rods 5 being connected by a coupler 12. In accordance with the arrangement of the kinematic linkage, when there are small deflections of connecting rods 5 a linear movement, running horizontally in the exemplary embodiment, of coupler 12 can take place in the direction of the longitudinal axis of coupler 12. For deflections that are very small relative to the length of connecting rods 5, a rotary movement of coupler 12 can be ignored, so that a horizontal linear movement can be assumed. Here it can be assumed that coupler 12 is constructed in one piece with quill 3. If there now takes place a horizontal shifting of quill 3 along longitudinal axis 4, there likewise takes place a small shifting of coupler 12 in its longitudinal direction. This causes a pivoting of connecting rods 5 about the hinge connected to the side of machine frame 2, with small deflection angles. Here the hinges form points of connection 6 that connect connecting rods 5 to machine frame 2 at one side and to quill 3 at the other side. Given a direct connection of connecting rods 5 via points of connection 6 to quill 3, the quill can be regarded directly as coupler 12, forming a component of the kinematic linkage. Thus, connecting rods 5 can each be situated in a bearing plane 8 (not shown in FIG. 1), so that coupler 12 can be omitted. In FIG. 1, two bearing planes 8 are present that are situated separately from one another in order to create a linear guide 1 that connects quill 3 to machine frame 2 in at least two planes. The horizontal deflection of quill 3 in the direction of longitudinal axis 4 can comprise an oscillatory movement having a deflection distance of for example <0.1 mm or <5 mm. Here, a possible oscillation frequency is in the range of, for example, <10 Hz or <500 Hz. Due to the small deflections of the hinges at connecting points 6, these can be realized as notch hinges; when there is an elastic deformation due to the deflection, these hinges introduce a deflection force into connecting rods 5 or into quill 3, forming together with quill 3 a spring-mass system that is capable of oscillation in the direction of longitudinal axis 4. The rigidity of the notch hinge in the direction of oscillation and in the transverse direction, i.e. perpendicular to longitudinal axis 4, can be varied and adapted arbitrarily here.

Due to the arrangement of the linear guide with notch hinges, this linear guide is essentially free of wear, and, depending on the direction of excitation of the oscillatory movement, either a linear oscillatory movement in the direction of longitudinal axis 4 or an oscillatory movement having a component perpendicular to longitudinal axis 4 can be enabled. In addition, the arrangement according to the present invention of the hinges creates the possibility of realizing undercuts during the electrochemical metal machining. In addition, the movement paths for the oscillation can be adapted for an optimal electrolyte exchange. In addition, a scalability can be enabled of the size of the oscillatory movement or of the magnitude of the oscillation frequency through a targeted adaptation of the notch hinges.

Figure 2:
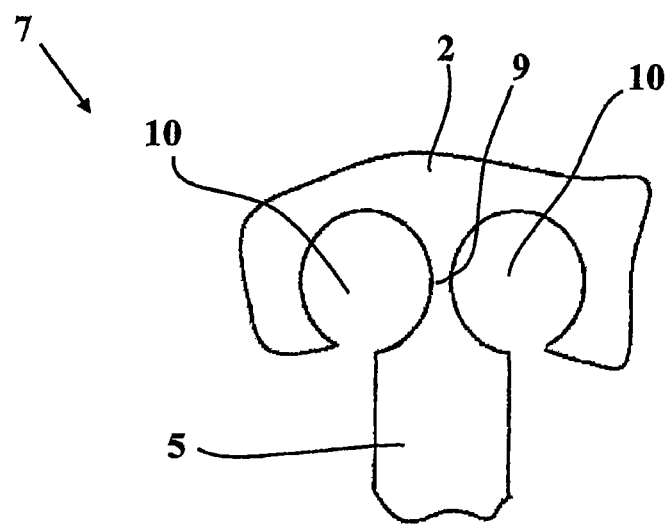
FIG. 2 shows a notch hinge having a flexible beam that is formed by two circular recesses.

FIG. 2 shows a notch hinge 7 that forms a point of connection 6 (FIG. 1) between machine frame 2 and connecting rod 5, or between quill 3 and connecting rod 5. Here, the hinge movement takes place on the basis of an elastic bending in a flexible beam 9 whose width is formed by two recesses 10. Notch hinge 7 can be made of a metallic material in the form of a steel plate, and recesses 10 can be created for example using a laser beam separating process, an erosion process, a PECM process, or a water jet cutting of the plate material. The plate material can be any material having at least a sufficient range of elasticity to enable sufficient deformation of flexible beam 9 without plastic deformation.

In particular, a spring steel can be used, which can additionally be selected to be a special steel in order to provide resistance to corrosion. According to the present exemplary embodiment, notch hinge 7, an area of machine frame 2, and connecting rod 5 form a one-piece component; notch hinge 7 can also have a multipart construction in order to enable flexible beam 9 to be exchanged. In this way, the rigidity and thus the oscillation behavior of the oscillatory movement can advantageously be adapted by a simple exchanging of flexible beam 9. According to the present exemplary embodiment, recesses 10 are shown as circular, but these can also be elliptical, rectangular, and/or triangular.

Figure 3A:
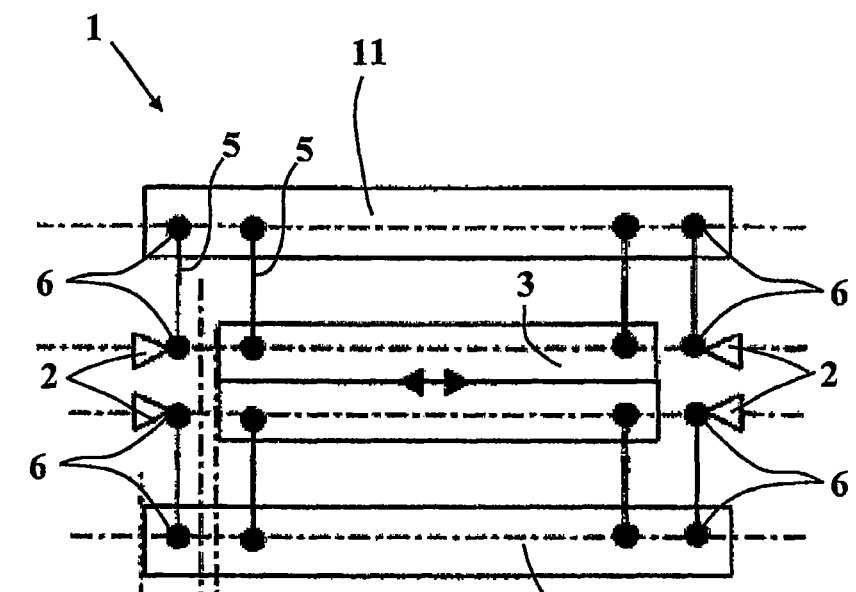
FIG. 3a shows an exemplary embodiment of a linear guide having a compensating bridge in the non-deflected state, connected to the quill and to the machine frame via connecting rods.
Figure 3B:
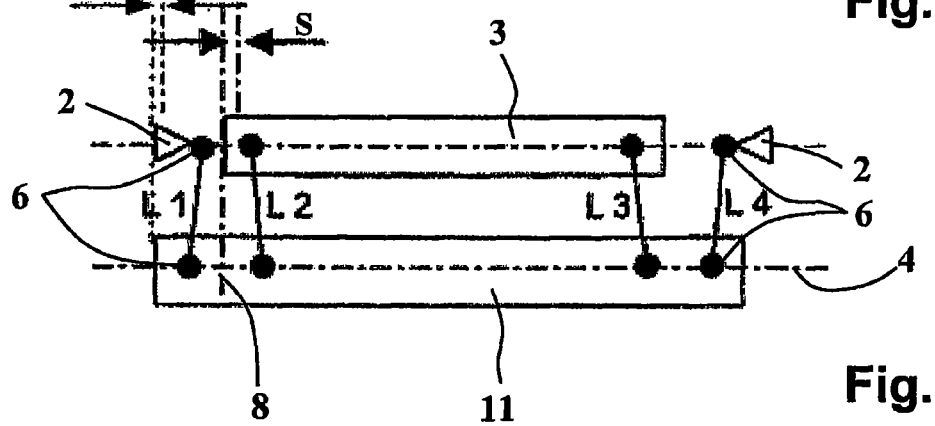
FIG. 3b shows a part of the exemplary embodiment shown in FIG. 3a of the linear guide having a compensating bridge in a deflected state.

FIGS. 3a and 3b show a linear guide 1 having a compensating bridge 11 that is situated between quill 3 and machine frame 2 via connecting rods 5. Machine frame 2 is again schematically indicated by stationary supports. The situation of connecting rods 5, compensating bridge 11, and the respective connection of connecting rods 5 via connecting points 6 can also be regarded here as a kinematic linkage, forming, with respect to quill 3, two bearing planes 8 situated separately from one another (right side not shown). In FIG. 3a, linear guide 1 is shown in a non-deflected state, and FIG. 3b shows a deflection of quill 2 in the direction of longitudinal axis 4. Here, FIG. 3b reproduces the lower part of linear guide 1 from FIG. 3a, and quill 3 in FIG. 3b corresponds to the lower half of quill 3 from FIG. 3a (as a half section). Compensating bridge 11 in FIG. 3b corresponds to lower compensating bridge 11 from FIG. 3a. In FIG. 3b, quill 3 is shown in a state that is deflected relative to machine frame 2, the linear movement corresponding to deflection S. Here, compensating bridge 11 is deflected by the distance S/2, so that connecting rods L1 and L4, as well as connecting rods L2 and L3, are in each case deflected parallel to one another. Here, for a given deflection S the deflection force can be halved, thus halving the rigidity of the linear guide, or doubling its flexibility. This makes it possible to adapt the rigidity of the linear guide with respect to the linear deflection of quill 3 in the direction of longitudinal axis 4 so as to meet the requirements of the specific application. Compensating bridge 11 can be constructed here in such a way that it connects the system of connecting rods 5 in the respective bearing planes 8 to one another at compensating bridge 11, so that this bridge has a one-piece construction. In order to achieve a deflection S, the deformation or deflection angle of flexible beam 9 in notch hinges 7, which form connecting points 6, can thus be halved. Bearing planes 8 and longitudinal axes 4 are represented by dash-dot lines. Deflection S is shown in FIG. 3*b* by dashed lines, relative to the non-deflected linear guide shown in FIG. 3*a*, the magnitude being indicated by arrows at the ends of quill 3 or at compensating bridges 11.

The realization of the present invention is not limited to the preferred exemplary embodiment indicated above. Rather, a number of variants are conceivable that make use of the present solution in embodiments that are fundamentally different in their construction.

The invention claimed is:

1. A linear guide for a device for electrochemical metal machining, that guides a linear movement of a quill that is moved periodically in a machine frame to periodically modify a working gap between a cathode situated on the quill and a workpiece in the direction of the longitudinal axis of the quill, the guide comprising:

at least two connecting rods connecting the quill to the machine frame, the connecting rods being situated, in the no-load, non-deflected state, essentially parallel to each other and transverse to the longitudinal axis of the quill, and the connecting rods having at the point of connection to the quill, as well as at the point of connection to the machine frame, notch hinges for enabling periodic linear movement of the quill with reduced wear on the linear guide, and the flexibilities of these notch hinges being based on elasticities in their structures formed by targeted thinning of the material; and a coupler being parallel to the longitudinal axis of the quill and connected to the quill, and connecting ends of said at least two connecting rods for conveying movements of the quill to said at least two connecting rods.

2. The linear guide as recited in claim 1, wherein the quill has at least two bearing planes, each bearing plane being formed from at least one of said at least two connecting rods.

3. The linear guide as recited in claim 2, wherein at least two bearing planes are situated at a large distance from one another in the direction of the longitudinal axis of the quill, in order to optimize the rigidity of the linear guide.

4. The linear guide as recited in claim 1, wherein for an elastic movement, the notch hinges have flexible beams, these being formed by recesses that are made laterally to the flexible beam.

5. The linear guide as recited in claim 4, wherein the recesses have an elliptical, circular, rectangular, and/or triangular contour.

6. The linear guide as recited in claim 4, wherein the notch hinges are realized as plate springs, the flexible beam going over into the connecting rod in one piece.

7. The linear guide as recited in claim 1, wherein said at least two connecting rods are connected to a compensating bridge, at least one of said two connecting rods being situated between the compensating bridge and the machine frame, and another of said at least two connecting rods being situated between the compensating bridge and the quill.

8. The linear guide as recited in claim 1, wherein at least one of the notch hinges and the connecting rods are manufactured from a flat material, their manufacture including a laser beam separating process, an erosion process, a PECM process, or a water jet cutting process.

9. The linear guide as recited in claim 1, wherein the periodic linear movement of the quill is an oscillatory movement, the oscillatory movement of the quill having a stroke of <5 mm.

10. The linear guide as recited in claim 9, wherein in that the oscillatory movement of the quill has a stroke of <1 mm.

11. The linear guide as recited in claim 9, wherein in that the oscillatory movement of the quill has a stroke of <0.1 mm.

12. The linear guide as recited in claim 9, wherein in that the oscillatory movement of the quill has a frequency of <500 Hz.

13. The linear guide as recited in claim 9, wherein the oscillatory movement of the quill has a frequency of <50 Hz.

14. The linear guide as recited in claim 9, wherein the oscillatory movement of the quill has a frequency of <10 Hz.

15. The linear guide as recited in claim 14, wherein the notch hinges and/or the connecting rods comprise a metallic material from the group including a spring steel and preferably a stainless steel.

16. The linear guide as recited in claim 1, wherein a first end of each said connecting rod is hingedly connected to the quill, and a second end of each said connecting rod is hingedly connected to the machine frame.

* * * * *